United States Patent [19]

Sheem

[11] 4,262,994

[45] Apr. 21, 1981

[54] ELECTRO-OPTICALLY BALANCED MULTI-PIECE OPTICAL WAVEGUIDES

[76] Inventor: Sang K. Sheem, 7123 Layton Dr., Springfield, Va. 22150

[21] Appl. No.: 111,444

[22] Filed: Jan. 11, 1980

[51] Int. Cl.[3] .............................................. G02B 5/14
[52] U.S. Cl. ................................. 350/96.14; 350/355
[58] Field of Search ............... 350/96.12, 96.13, 96.14, 350/355, 356

[56] References Cited

U.S. PATENT DOCUMENTS

| 3,874,782 | 4/1975 | Schmidt | 350/96.13 |
|---|---|---|---|
| 3,877,781 | 4/1975 | Kaminow | 350/96.14 |
| 4,012,113 | 3/1977 | Kogelnik et al. | 350/96.13 |
| 4,048,591 | 9/1977 | Auracher | 350/96.14 X |
| 4,070,094 | 1/1978 | Martin | 350/96.14 |
| 4,094,579 | 6/1978 | McMahon et al. | 350/96.14 X |
| 4,157,860 | 6/1979 | Maractili | 350/96.14 |

OTHER PUBLICATIONS

Schmidt et al., "Electro-Optically Switched Coupler With...", *Applied Phys. Lett.,* vol. 28, No. 9, May 1976, pp. 503–506.
Kogelnik et al., "Switched Directional Couplers With Alternating Δβ", *IEEE J.Q.E.,* vol. QE-12, No. 7, Jul. 1976, pp. 396–401.
Steinberg et al., "Performance Limitations Imposed on Optical...", *Applied Optics,* vol. 15, No. 10, Oct. 1976, pp. 2440–2453.
Steinberg et al., "Polarization-Insensitive Integrated-Optical Switches:...", *Applied Optics,* vol. 16, No. 8, Aug. 1977, pp. 2166–2170.
Burns et al., "Interferometric Waveguide Modulator With...", *Applied Phys. Lett.,* vol. 33, No. 11, Dec. 1978, pp. 944–947.

*Primary Examiner*—John K. Corbin
*Assistant Examiner*—John D. Lee
*Attorney, Agent, or Firm*—R. S. Sciascia; William T. Ellis; Philip Schneider

[57] ABSTRACT

An electrooptical waveguide assembly comprising a plurality of waveguide blocks wherein each of said waveguide blocks has a waveguiding region and a substrate region supporting the waveguiding region, the waveguide blocks being connected in a row to have successive face-to-face contact in such a way that said waveguiding regions are aligned for continuous optical-beam transfer from one of said waveguide blocks to the next, and the crystallographic orientations of any two neighboring waveguide blocks are different from each other so that two orthogonal propagating modes being guided through said waveguiding regions experience a balanced electrooptic effect from electric fields applied to the waveguide.

8 Claims, 9 Drawing Figures

ELECTRO-OPTICALLY BALANCED MULTI-PIECE OPTICAL WAVEGUIDES

BACKGROUND OF THE INVENTION

This invention relates to electrooptic waveguide assemblies and especially to a means and method for balancing the effect of electric fields on the TE and TM modes of light propagating through electrooptic waveguides.

It is well known that the magnitude of index of refraction can be changed by applying an external electric field in some crystals. This property has been widely utilized for the switching and modulation of guided as well as unguided (bulk) optical beams. In general, selection of proper crystal orientation is a prerequisite for successful operation of electrooptic devices since the electrooptic effect is anisotropic.

Over the past decade, fiber optics and integrated optics have been vigorously developed in an attempt to realize compact, high-capacity, optical, information-processing devices for optical communication. The idea is to develop various active devices for optical-beam switching, modulation, or multiplexing, and to link the active devices by optical fibers over substantial distances, thus forming optical communication networks. Throughout such networks, the optical beam is guided by optical waveguides for the purpose of optical energy confinement and directional guidance.

Recently, it was found that in optical fibers the polarization (the direction of the electric field of the optical beam) of guided modes is unpredictably fluctuating: the guided mode does not maintain linear polarization but rather an unknown elliptical polarization. (Reference: "Performance limitations imposed on optical waveguide switches and modulators by polarization," Applied Optics, Vol. 15, p. 2440, 1976, by R. A. Steinberg and T. G. Giallorenzi). Such elliptical polarization occurs because optical fibers have a circular cross-section which, due to slight stress or disturbance, allows the polarization to rotate.

On the other hand, in channel waveguides, there exists two orthogonal propagation modes the polarizations of which are (predictably) definite. Especially, in isotropic waveguides and cubic orientation anisotropic waveguides, the eigenmode polarization is either mainly parallel or mainly perpendicular to the waveguide surface. As a result, for beam coupling from fiber to channel waveguides, the beam from the fiber generally excites both orthogonal modes, each having different polarization. Since, as mentioned above, the electrooptic effect is anisotropic in general, one propagation mode experiences greater electrooptic effect (i.e., index change) than the other. Thus, simultaneous switching or modulation of both propagation modes is not achievable unless some specific means is devised to correct or balance the electrooptic effects for both modes.

SUMMARY OF THE INVENTION

Accordingly, it is an object of the present invention to provide a means to balance the electrooptic effects for both propagation modes so that an optical wave with either polarization can be switched or modulated with a driving voltage comparable to that required for switching and modulation of the other polarization.

The invention comprises a series of waveguide blocks wherein any two neighboring blocks have different crystallographic orientation and are connected in such a way that waveguides fabricated in the blocks are connected in series to form one continuous waveguide. In this arrangement, one always can choose the crystallographic orientation of each substrate block in such a way that the optical beam with one polarization would experience strongest electrooptic effect in one block while the optical beam with the other orthogonal polarization would experience the strongest electrooptic effect in the neighboring block. As a result, an optical beam with either polarization would see the same or a quite similar overall electrooptic effect while propagating through the series of waveguides in the blocks.

The detailed features, objects and advantages of the present invention will be further clarified in the following description.

DETAILED DESCRIPTION OF THE INVENTION

Figure 1:
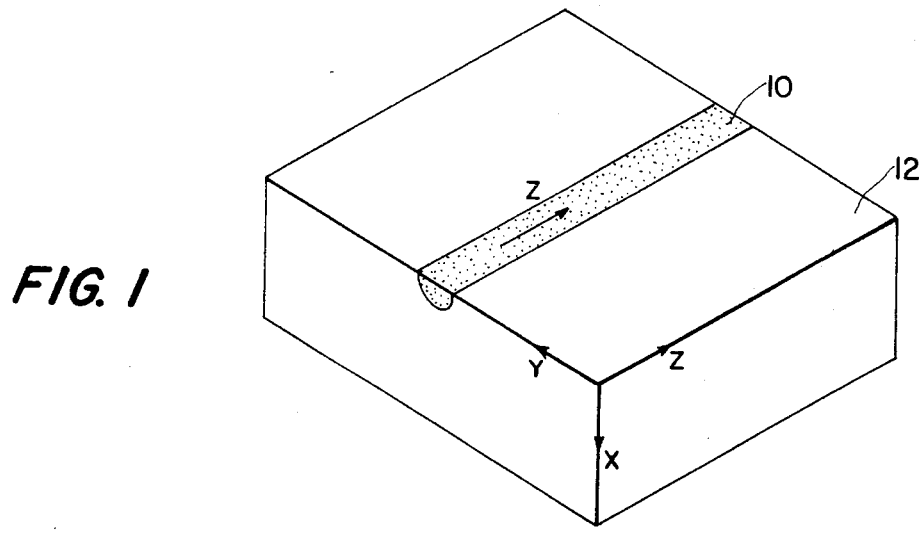
FIG. 1 is a schematic perspective diagram of an optical channel waveguide (dotted region) fabricated in an electrooptic crystal substrate block.
Figure 2:
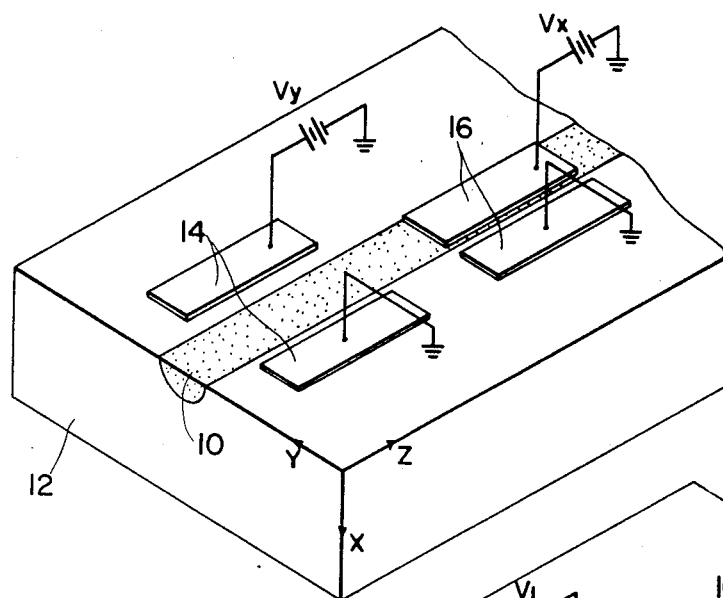
FIG. 2 is a perspective view showing the conventional way to realize the polarization-insensitive electrooptic operation.

FIG. 1 shows a schematic view of an optical channel waveguide 10 fabricated on top of electrooptic crystal substrate block 12. In general the crystal material is dielectric and frequently optically anisotropic. The channel waveguide 10 can be in or on the surface of the crystal substrate and fabricated by various methods which include indiffusion of foreign materials at high temperature, bombardment of the guiding region by ions in the vacuum environment, or epitaxial growth. Regardless of techniques employed, the channel region 10 can trap and guide an optical beam if the index of refraction in the region is higher than that of the surrounding regions that include the crystal substrate and superstrate top region, which is usually air. For convenience, assume the spatial coordinate system as shown and further assume optical wave propagation in the z-direction. It is well known that in electromagnetic waveguides such as shown in FIG. 1 there exist two kinds of propagating modes wherein one mode has its electric field in one orientation, and the other mode in the orthogonal orientation. When the coordinate axes X, Y and Z in FIG. 1 coincide with the crystallographic axes, there are the TE-mode having its electric field dominantly parallel to the Y axis and TM-mode having its electric field dominantly parallel to the X-axis. (The invention will be described with respect to this orientation of the waveguide axes although the invention will operate with other orientations; however, the principle is simpler to explain when the waveguide and crystal axes are coincident.) When an external electric field is applied across pairs of electrodes 14 or 16 as shown in FIG. 2, the index of refraction of the waveguide 10 changes, the amount of change being different for one mode compared to that of the orthogonal mode. Assume that a propagating mode with one polarization experiences an index change of an amount $(\Delta n_1)$ and the other mode with the orthogonal polarization of an amount $(\Delta n_2)$. Then, in general, $$(\Delta n_1)_y = f_y(V_y) \qquad (1)$$

$$(\Delta n_1)_x = p_x(V_x) \qquad (2)$$

$$(\Delta n_2)_y = g_y(V_y) \qquad (3)$$

$$(\Delta n_2)_x = q_x(V_x) \qquad (4)$$

where f, g, p and q are proper functional forms; and the subscript y (or x) denotes that the applied field is dominantly parallel to the Y-(or X-) axis. If $V_x = 0$ but $V_y \neq 0$ in FIG. 2, we have, from (1)–(4), $$(\Delta n_1) = (\Delta n_1)_y = f_y(V_y)$$

$$(\Delta n_2) = (\Delta n_2)_y = g_y(V_y)$$

and in general
$$(\Delta n_1) \neq (\Delta n_2)$$

In order to satisfy the condition $(\Delta n_1) = (\Delta n_2)$, we can apply both voltages $V_y$ and $V_x$ in FIG. 2 and try to find the solutions for $V_y$ and $V_x$ that satisfy the following equation: t,0070
However, in general, the solution for $V_x$ is at least a few times larger than the solution for $V_y$ in (5), or vice versa, when the lengths of electrodes are the same. This is because the electrooptic effect is strongest only when the applied electric field is along some specific direction, for example, the Y-direction. Furthermore, even in the case of optimum field direction, the electrooptic effect for one mode (1) is usually larger than that for the other mode (2). For example, if we assume that LiNbO$_3$ crystal is used in the waveguide structure shown in FIGS. 1 and 2, $V_y$ and $V_x$ should be different by a factor of five if one wants to utilize the $r_{33}$ electrooptic coefficient which is the largest. As a result, one would need only several volts for $V_y$ but tens of volts for $V_x$ if the Y-axis coincides with the optic axis of the LiNbO$_3$ crystal. (As assumed above, the electrooptic effect is strongest when the field is parallel to the Y-axis. In LiNbO$_3$ this means that the Y-axis coincides with the optic axis). In short, it is not possible to lower both voltages $V_x$ and $V_y$ in the scheme of FIG. 2 when one wishes to satisfy the condition $(\Delta n_1) = (\Delta n_2)$, which is the necessary condition for simultaneous switching and modulation of both orthogonal modes of different polarizations.

Figure 3:
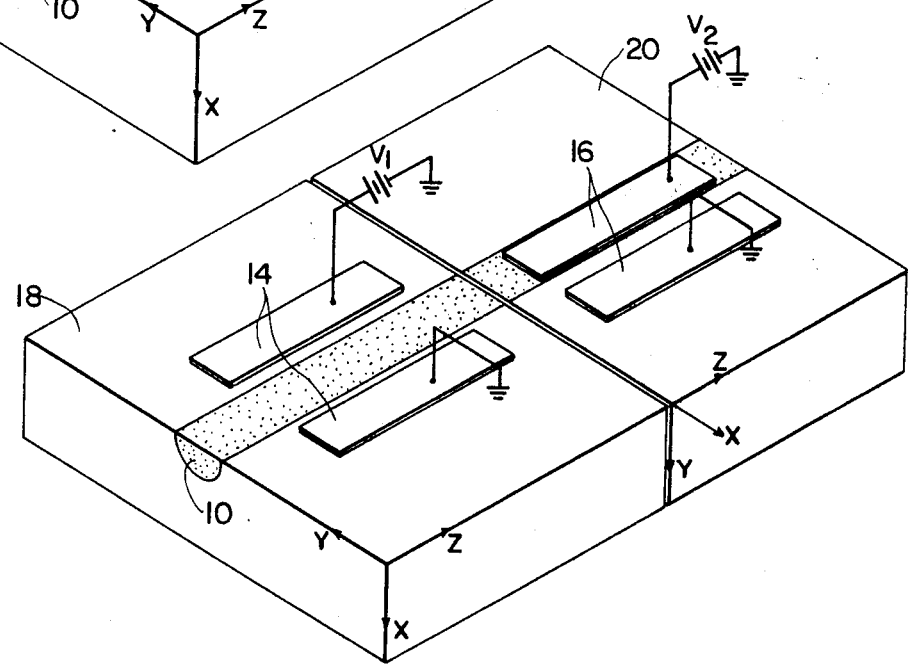
FIG. 3 is a schematic perspective view of a basic unit of the present invention wherein two crystal blocks are butt-jointed so that the channel waveguides are aligned in a series to form a straight waveguide as a combination.

FIG. 3 shows the basic unit of the present invention which solves the problem described above. Here, two pieces of crystal substrate blocks 18 and 20 are connected in series by the face-to-face joint method. As shown, the first block has the Y-axis parallel to the substrate surface plane while the second block has the Y-axis perpendicular to it. Thus, when electrodes 14 and 16 are fabricated as shown, it is clear that the resultant applied electric fields will be dominantly parallel to the Y-axis in both waveguide blocks 18 and 20. Thus, if the electrooptic effect is strongest when the applied electric field is parallel to the Y-axis, as we assumed above, it is clear that, in FIG. 3, the applied fields are along the optimum direction in both blocks 18 and 20. On the other hand, the relative orientations between the Y-axis and the polarization directions of the propagating modes are switched in the second block 20 compared to that in the first block 18. For example, a TE-mode would be dominantly parallel to the Y-axis in the first block 18, but dominantly perpendicular to it in the second block 20. A TM-mode would have the opposite situation. As a result, both modes would have experienced the same or quite similar amounts of electrooptic effect after having propagated through the channel waveguide 10 being formed by the two butt-jointed channel waveguide sections fabricated in the first and second waveguide blocks.

Figure 4:
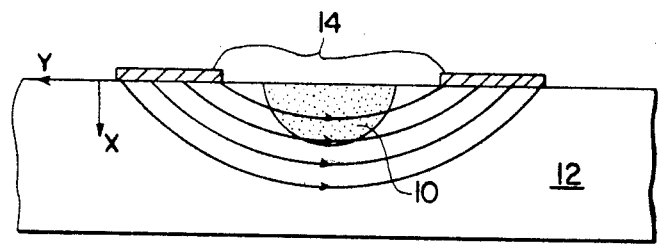
FIG. 4 is a partial diagram showing the applied electric field across the channel waveguide.
Figure 5:
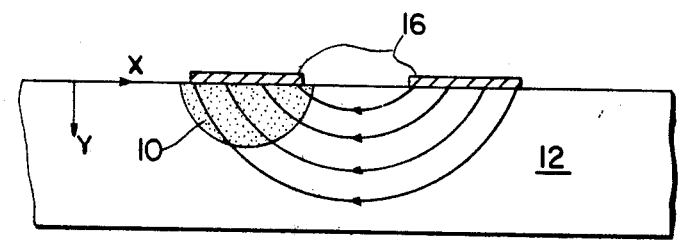
FIG. 5 is a partial diagram showing the applied electric field crossing the channel waveguide mainly in the direction perpendicular to the substrate surface.

If the notations employed in (1)–(5) above are used:

$$(\Delta n_1) = f_y(V_1) + g_y(V_2) \qquad (6)$$

$$(\Delta n_2) = g_y'(V_1) + f_y'(V_2), \qquad (7)$$

where $f_y$ and $f_y'$ (and $g_y$ and $g_y'$) have very similar functional forms, but would not be exactly the same in general. The origin of the difference comes from the geometrical difference as pointed out in FIGS. 4 and 5. As shown, the electric field represented by arrowed curves are dominantly parallel to the Y-axis in the channel waveguide regions 10 in both cases. Although the effective ratio between the X- and Y-components of electric fields cannot be made exactly equal in both cases due to the different geometrical arrangements of electrodes and the resulting field mapping, it is clear that it is not difficult to insure by proper design of electrodes that:

$$f_y = f_y' \qquad (8)$$

$$g_y = g_y' \qquad (9)$$

In that case, from (6)–(9), we get:

$$(\Delta n_1) = (\Delta n_2) \text{ when } V_1 = V_2 \qquad (10)$$

where $V_1$ and $V_2$ are solutions of $$f_y(V_1) + g_y(V_2) = f_y'(V_2) + g_y'(V_1) \qquad (11)$$

In other words, the magnitudes $V_1$ and $V_2$ can be made near-minimum simultaneously. In the LiNbO$_3$ case, if the optic axis coincides with the Y-axis in FIG. 3, $V_1$ and $V_2$ can be simultaneously made as small as several volts.

There are many electrooptic crystals with different characteristics. Furthermore, to be exact, one should solve the wave equation for the given channel waveguide structure to calculate the change of the effective index of each mode due to the index change $(\Delta n_1)$ or $(\Delta n_2)$ which represents the change of the bulk index along the polarization direction of each mode. However, such exact calculation would alter neither the basic virtue of the present invention nor the numerical values for required voltages $V_1$ and $V_2$ and their ratio by any substantial amount.

Figure 6:
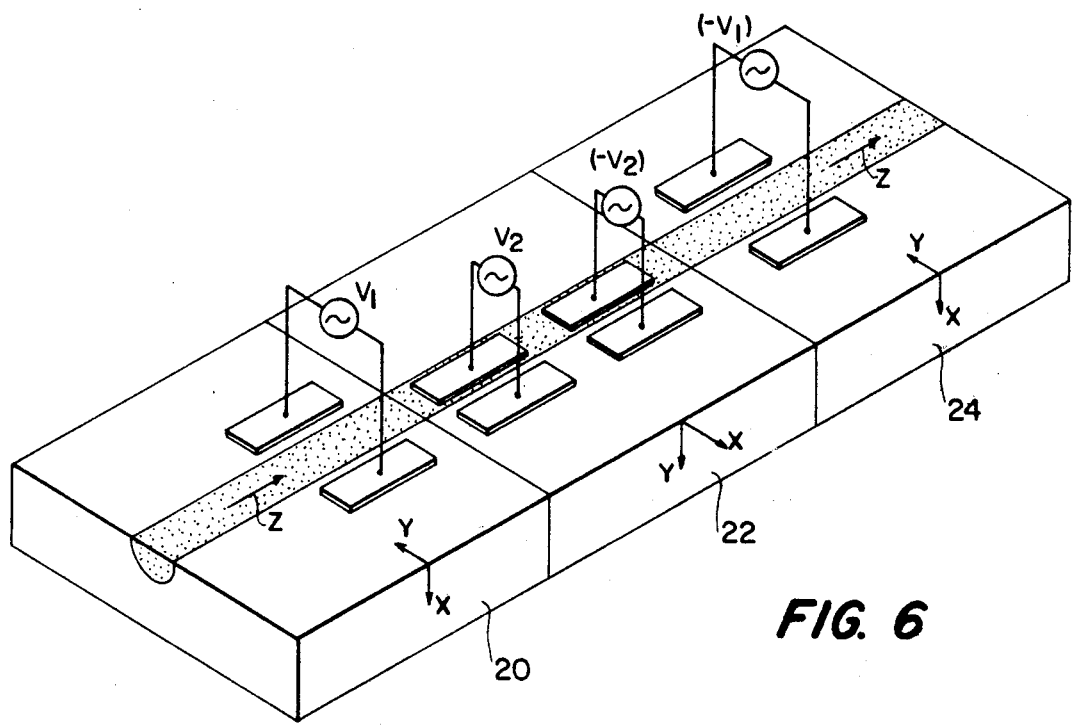
FIG. 6 is a perspective diagram showing a way to apply the concept of this invention to the switching scheme where two voltages of opposite sign are needed for each polarization.
Figure 7:
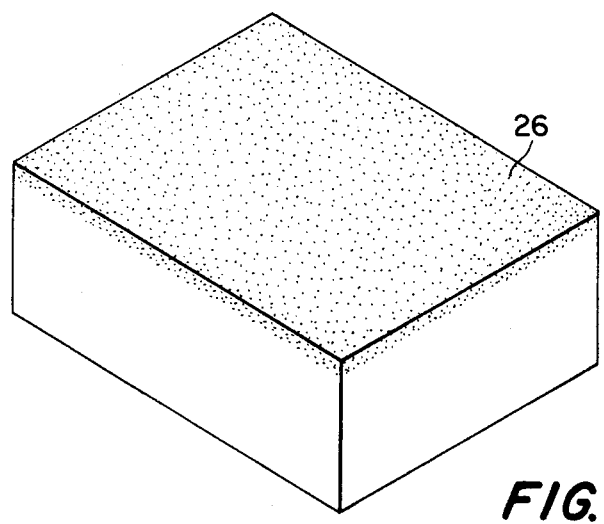
FIG. 7 is a perspective diagram showing that a waveguide in this invention may have planar layer instead of channel shape.

It is also clear that more than two blocks can be butt-jointed in series in the same fashion as shown in FIG. 3. Such multiplicity of connections would be required when one propagating mode needs more than one pair of electrodes to be successfully switched or modulated. For example, in the switching device of Kogelnik and Schmidt (IEEE Journal of Quantum Electronics, Vol. QE-12, p. 396 (1976), two pairs of electrodes are needed for each mode (polarization), one operating at an applied voltage V, the other at (−V). FIG. 6 shows a way of realizing the device for both polarizations utilizing three blocks 20, 22, 24 in series. As shown, in all three blocks 20, 22, 24, electric fields are designed to be dominantly parallel to the Y-axis, thus ensuring the strongest electrooptic effect in all blocks 20, 22, 24. By alternating the X- and Y-axes as shown, one makes sure that both orthogonal polarizations of propagating modes experience the same amount of electrooptic effect as described above in relation to FIG. 3.

It is clear that the waveguide blocks may possess any shape so long as the waveguide regions are well aligned and connected so as to smoothly transfer the optical wave from one block to the next.

It is also apparent that the particular nature of the waveguides does not matter in this invention. It can be a channel waveguide of single or multiple transverse modes. It can also be a planar waveguide 26 where the side boundaries are absent, so that optical wave can propagate into any direction. In order to reduce the coupling loss of a guided wave occuring when the wave is transferred from one waveguide block to the next, one can polish the end surfaces and employ registration grooves 30 for alignment purposes as shown. If the electrooptic waveguide blocks are transparent, as they usually are in general, one can flip the waveguide blocks and lay them against a common flat substrate having matched registration grooves in order to achieve high alignment between the neighboring channel waveguides.

Figure 8:
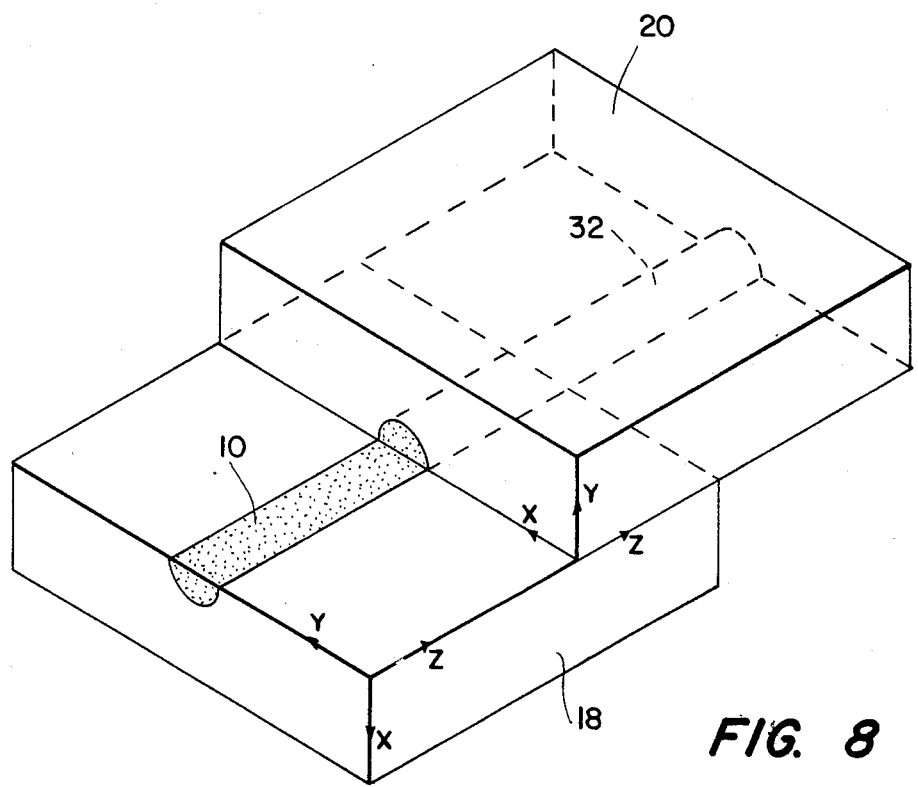
FIG. 8 is a perspective diagram showing that, without altering the concept of this invention, the waveguide blocks can be alternately flipped and brought together to allow evanescent field coupling between two neighboring waveguide regions.

If the anisotropy is small, one can also use evanescent field coupling between one waveguide and the other as shown in FIG. 8, where a waveguide block 20 is flipped and aligned against the other waveguide block 18 so that an optical wave can be coupled from one waveguide 10 to the next 32 by evanescent field tunneling. If the X- and Y- axes are switched over two waveguide blocks as shown in FIG. 8, the balance of electrooptic effect for both the orthogonal polarizations would be achieved in exactly the same way as in FIG. 3. Here, one can also utilize registration grooves for critical alignment.

Figure 9:
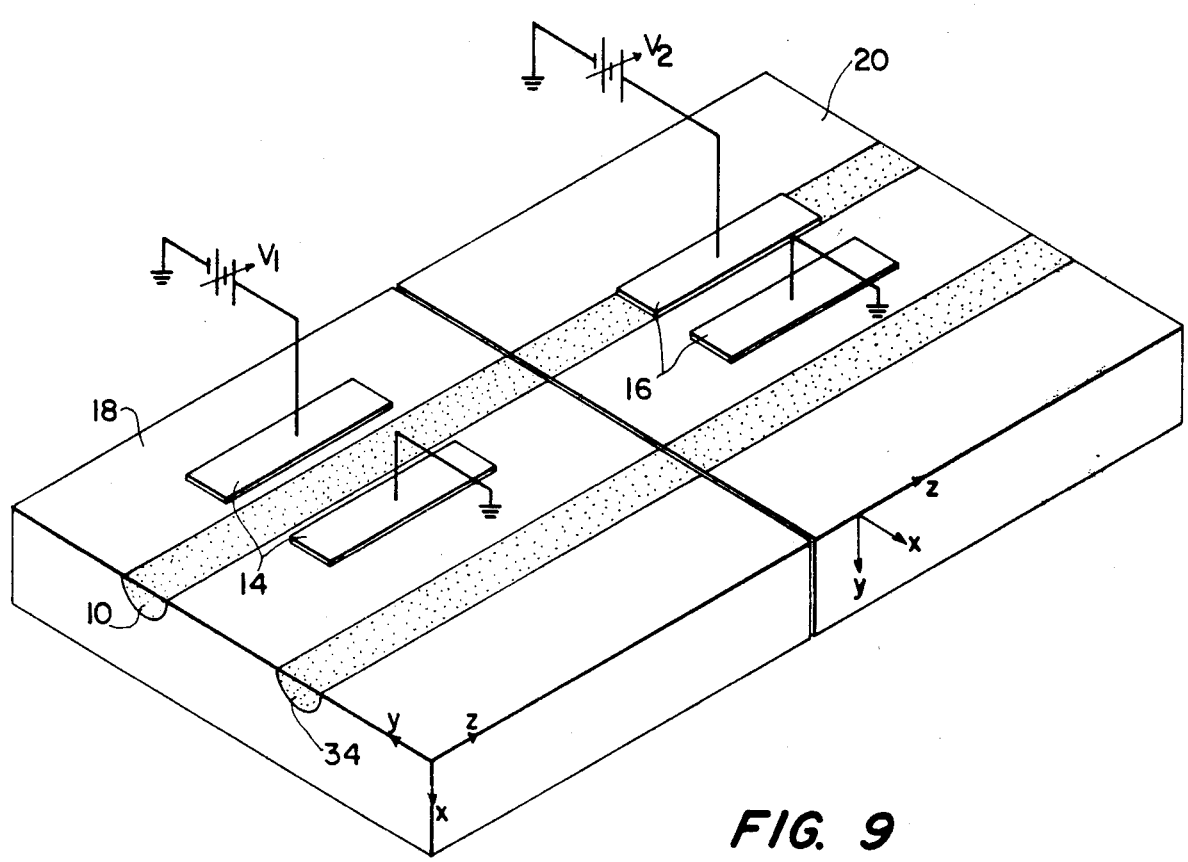
FIG. 9 is a perspective view of a practical application of the invention in an optical switch.

FIG. 9 is an illustration of the use of the waveguide blocks 18 and 20 in an optical switch. The only difference between FIGS. 3 and 9 is that FIG. 9 has a second waveguide section 34 paralleling waveguide section 10. In the actual device, there would be input optic fibers feeding the waveguide sections on block 18 and output optic fibers (not shown) deriving the optic signals coming through the waveguide sections on block 20. Optical waves propagating through the input fibers could be switched between the fibers by varying the propagation constants of the waveguide sections on the blocks by properly varying the electrode voltages, $V_1$ and $V_2$.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An electrooptical waveguide assembly comprising:
   at least one pair of sections, each section comprising a crystal substrate the index of refraction of which can be changed by an electric field, an optical waveguide running longitudinally in or on said substrate and electric field means for applying an electric field to said waveguide,
   said pair of sections being physically arranged so that the longitudinal axes of their waveguides are parallel and abut one another so that said waveguides couple together and one of the X, Y, Z axes of one crystal substrate, e.g., the Z axis,
   is in the same direction as that of the other, and the X, Y axes of one substrate are orthogonal to the X, Y axes of the other,
   the electric field means on one substrate being arranged to apply an electric field to its associated waveguide in one direction, e.g., horizontal, and the electric field means on the other substrate being arranged to apply an electric field to its associated waveguide in the orthogonal direction, e.g., vertical, so that the electrooptic effect of the electric fields on two orthogonal propagation modes in the waveguide assembly is substantially the same.

2. A waveguide assembly as in claim 1, wherein the electric field in each section is applied in the direction of the easy axis of the crystal.

3. A waveguide assembly as in claim 1, wherein the X, Y, Z axes are those of the crystal substrate, the longitudinal axis of the waveguides is in the Z direction, the electric field in one section is predominantly parallel to the surface of the waveguide and therefore predominantly parallel to the TE propagation mode therein, and the electric field in the other section is predominantly perpendicular to the surface of the waveguide and therefore predominantly parallel to the TM propagation mode therein.

4. A waveguide assembly as described in claim 1 having a plurality of said section pairs.

5. An electrooptic waveguide assembly comprising:
   a first section comprising a crystal substrate the index of refraction of which can be changed by an electric field, said substrate having an optical wave transmission portion, and means for applying an electric field to said wave transmission portion;
   a second section comprising a crystal substrate the index of refraction of which can be changed by an electrical field, said substrate having an optical wave transmission portion, and means for applying an electric field to said wave transmission portion,
   one of the three orthogonal crystal axes in one section being arranged in parallel with the same axis in the other section, and the other two of the three orthogonal crystal axes of said second section being orthogonally shifted with respect to the same two axes in said first section,
   the optical wave transmission portions of said two sections being arranged to permit smooth transfer of an optical wave from one transmission portion to the other, the means for applying an electric field in one section being arranged to apply an electric field which is orthogonal in direction to that applied in the other section.

6. A waveguide assembly as in claim 5, wherein the electric field in each section is applied in the direction of the easy axis of the crystal.

7. An electrooptical waveguide assembly comprising:
at least one pair of sections, each section comprising a crystal substrate the index of refraction of which can be changed by an electric field, an optical waveguide running longitudinally in or on said substrate and electric field means for applying an electric field to said waveguide,
said pair of sections being physically arranged so that the longitudinal axes of their waveguides are parallel with said waveguides coupling together by means of the evanescent field, and one of the X, Y, Z axes of one crystal substrate, e.g., the Z axis, being in the same direction as that of the other, and the X, Y axes of one substrate being orthogonal to the X, Y axes of the other, and
the electric field means on one substrate being arranged to apply an electric field to its associated waveguide in one direction, e.g., horizontal, and the electric field means on the other substrate being arranged to apply an electric field to its associated waveguide in the orthogonal direction, e.g., vertical, so that the electrooptic effect of the electric fields on two orthogonal propagation modes in the waveguide assembly is substantially the same.

8. An electrooptical waveguide assembly comprising:
at least one pair of sections, each section comprising a crystal substrate the index of refraction of which can be changed by an electric field, an optical waveguide running longitudinally in or on said substrate and electric field means for applying an electric field to said waveguide,
said pair of sections being physically arranged so that the longitudinal axes of their waveguides are parallel with one section partially overlapping and on top of the other with the waveguides overlapping and in contact with each other along the overlapping portion, and one of the X, Y, Z axes of one crystal substrate, e.g., the Z axis, being in the same direction as that of the other, and the X, Y axes of one substrate being orthogonal to the X, Y axes of the other, and
the electric field means on one substrate being arranged to apply an electric field to its associated waveguide in one direction, e.g., horizontal, and the electric field means on the other substrate being arranged to apply an electric field to its associated waveguide in the orthogonal direction, e.g., vertical, so that the electrooptic effect of the electric fields on two orthogonal propagation modes in the waveguide assembly is substantially the same.

* * * * *